INVENTORS
Arthur O. Radke
Harvey N. Jengler
BY Popp and Sommer
ATTORNEYS

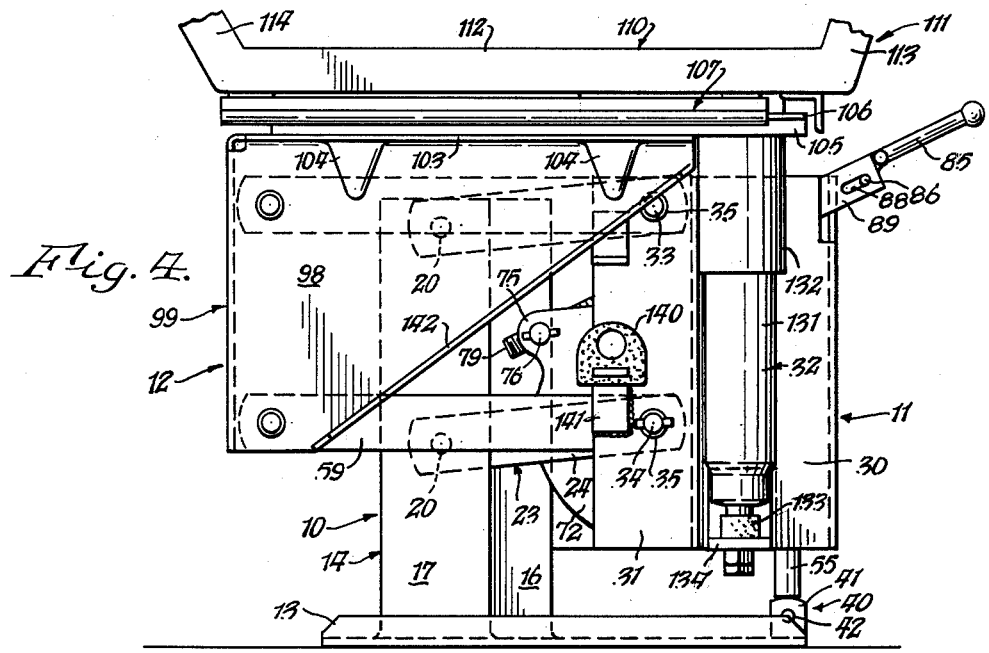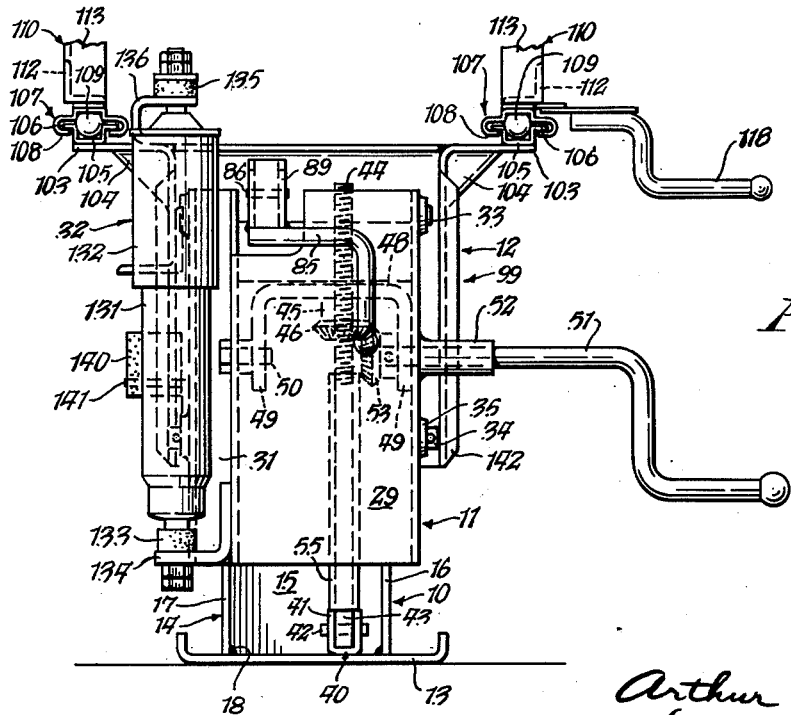

INVENTORS
Arthur O. Radke
Harvey N. Tengler
BY Popp and Sommer
ATTORNEYS

United States Patent Office 3,059,890
Patented Oct. 23, 1962

3,059,890
SEAT FOR HIGHWAY TRUCKS
Arthur O. Radke and Harvey N. Tengler, Milwaukee, Wis., assignors to Bostrom Corporation, Milwaukee, Wis., a corporation of Wisconsin
Filed Sept. 3, 1959, Ser. No. 837,889
8 Claims. (Cl. 248—399)

This invention relates to a seat structure and more particularly to such a seat structure designed for use in highway trucks and the like.

The present invention relates to the type of such seat structure in which the seat part is arranged directly over and moves toward and from the base part, the seat being guided by two vertically acting pairs of parallelogram links at opposite sides thereof and being resiliently supported or cushioned.

An object of the present invention is to provide a seat structure of this type which can be contained within a very limited horizontal space and which, at the same time, provides the required comfort and safety and leaves the occupant in full control of all controls of the vehicle, and in which the seat part moves with the occupant and is not drawn or jerked away from the occupant when the seat pressure becomes negative.

Another object of the invention is to provide such a type of seat structure which, while compact, can be adjusted to load variations so as to adapt it to persons of extremely different weight.

Another object is to provide such a type of seat structure in which only one rubber torsion spring is required to provide a desirable long range of movement and in which this torsion spring is simple, compact, low in cost and free from service difficulties.

Another object is to provide such a type of seat structure which is stable in a horizontal direction and will not list sidewise or pitch fore-and-aft even under extreme service conditions.

Another object is to provide such a type of seat structure in which the parallelogram links are of long effective length, while at the same time the seat structure is extremely compact in a horizontal direction.

Another object is to provide such a type of seat structure which is made of a plurality of low cost and sturdy subassemblies which can be easily coupled together.

Another object is to provide a seat structure of this type having a simple and easily manipulated adjustment for the height of the seat part thereof.

Another object is to provide a seat structure of this type having a simple and easily manipulated adjustment for the fore-and-aft position of the seat part thereof.

Another object is to provide a seat structure of this type having a simple and easily manipulated adjustment for adapting the seat structure to drivers of different weight.

Another object is to provide a seat structure of this type in which the moving parts are largely housed for their protection and to avoid possible injury from their movement.

Another object is to provide a seat structure of this type in which the housings for the moving parts are necessary main frame elements of the seat structure.

Another object is to provide a seat structure of this type having a hydraulic shock absorber compactly arranged.

Other objects and advantages of the invention will be apparent from the following description and drawings in which:

FIG. 4 is a fragmentary side elevational view, viewed from the opposite side of FIG. 1;

FIG. 5 is a fragmentary front elevational view thereof;

The seat suspension embodying the present invention is designed primarily for use where rough riding or extreme vertical and lateral impact conditions are encountered, such as with farm tractors, railroad locomotives and military vehicles, where lateral as well as vertical stability is particularly important. In general, the seat structure is shown as including a base part or supporting structure indicated generally at 10, an intermediate frame indicated generally at 11 and a seat part indicated generally at 12.

Figure 3:
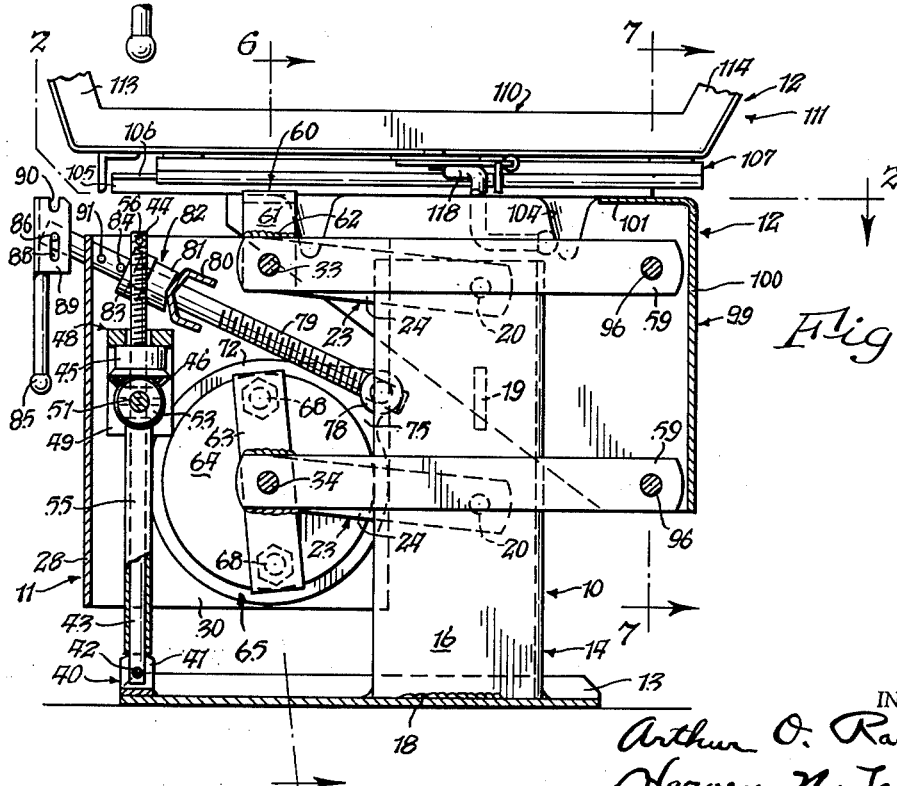
FIG. 3 is a vertical fore-and-aft sectional view taken generally on line 3—3, FIG. 2.
Figure 8:
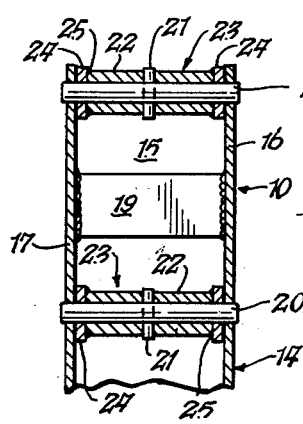
FIG. 8 is a fragmentary vertical sectional view taken generally on line 8—8, FIG. 2.

The base part or supporting structure 10 is shown as including a base in the form of a channel 13 extending fore-and-aft with reference to the seat structure and having side flanges extending upwardly. Rising from the rear end of the horizontal base plate 13 is a post or standard 14 which is U-shaped in cross section with its channel opening forwardly, having a rear cross part 15, a forwardly extending relatively long flange 16 at one side and a forwardly extending relatively short flange 17 at its opposite side. This post or standard 14 is shown as secured to the base plate or channel 13 by welding, as indicated at 18. The side flanges 16, 17 can be reinforced by an internal cross plate 19 as indicated in FIGS. 3 and 8.

A pair of pivot pins 20 are arranged in parallel spaced relation in a vertical plane and journalled at their ends in the side flanges 16, 17 of the vertical standard or post 14. As best shown in FIG. 8, each pivot pin 20 is fast, as by cross pin 21 to the cross part 22 of a yoke indicated generally at 23, as indicated by the arrow-headed lead line, and having forwardly projecting lever arms 24. The cross part 22 of this yoke 23 can be in the form of a sleeve and the forwardly projecting lever arms 24 can be in the form of flat metal bars welded to the sleeve 22, as indicated at 25, FIG. 8. These lever arms 24 of the yoke indicated generally at 23 are of substantially the same effective length and are in parallelogram arrangement, forming two pairs of vertically acting parallelogram linkages arranged at opposite sides of the post 14.

Figure 6:
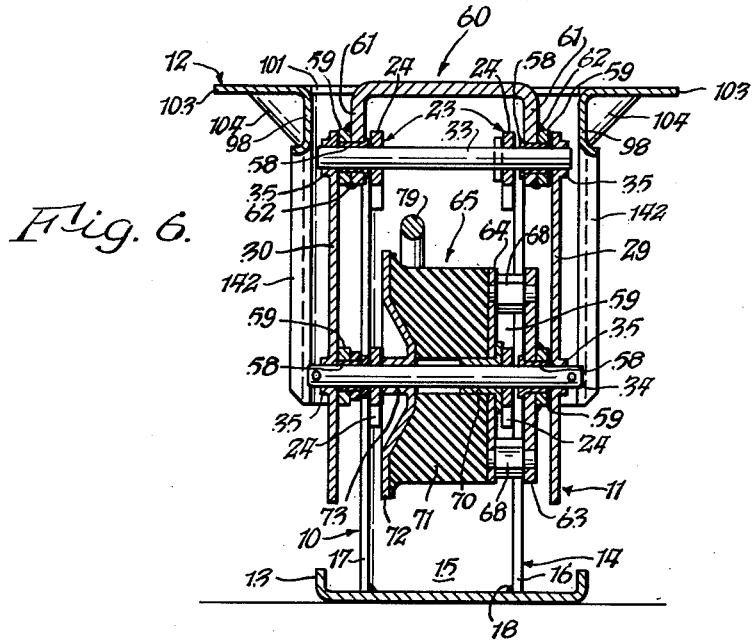
FIGS. 6 and 7 are vertical sectional views taken generally on the correspondingly numbered lines on FIG. 3.

The forward or free ends of the lever arms 24 of these yokes 23 support the intermediate frame 11. This intermediate frame 11 is in the form of a vertical channel with its open side facing rearwardly and the open side of the channel-shaped post 14 and having a vertical cross part 28 from the opposite vertical edges of each two integral side flanges 29 and 30 project rearwardly, the side flange 30 having an offset 31 to accommodate a shock absorber 32 as hereinafter described. A pair of vertically spaced generally parallel pivot pins 33 and 34 are arranged in a common vertical plane and pressed fitted in bosses 35 pressed outwardly from the side flanges 29, 30 of this intermediate frame 11. As best shown in FIGS. 3 and 6, the forward ends of the lever arms 24 of the two yokes 23 are journalled on these cross pins 33, 34 so that the standard or post 14 of the base part 10 and the intermediate frame 11 form with the lever arms 24 of the yokes 23 a parallelogram structure insuring that the intermediate frame remains vertical while moving vertically.

This vertical movement of this intermediate frame 11 is for the purpose of adjusting the elevation of the seat structure to suit the height and leg length of the driver and for this purpose a vertically extensible adjusting screw mechanism is interposed between the base part 10 and intermediate frame 11 and which is preferably constructed as follows:

The numeral 40 represents a U-shaped bracket having its cross part or base welded to the forward end of the base plate or channel 13 and having a pair of upstanding side ears 41. These ears carry a horizontal pivot pin 42 which extends transversely of the seat structure and pivotally supports a screw rod 43 the upper end of which is threaded as indicated at 44. This upper threaded end 44 of the rod 43 carries a nut 45 the lower part of which is formed to provide a downwardly facing bevel gear 46. This nut 45 supports the center cross part of an inserted U-shaped yoke 48 having depending end legs 49. One end leg 49 is journalled on a stub shaft 50 secured to the side flange or wall 31 of the intermediate frame 11. The other leg 49 is journalled on a crank shaft 51 extending through and journalled in a bearing 52 protruding outwardly from the opposite side wall or flange 29 of the intermediate frame 11. This crank shaft 51 is provided, externally, with a crank by means of which it is manually turned, and within the intermediate frame 11 it has a bevel gear 53 pinned thereto and meshing with the bevel gear 46 formed on the underside of the nut 45. It will therefore be seen that when the crank shaft 51 is turned, the bevel gears 53, 46 and nut 45 are turned to move the nut up or down the threaded end of the upstanding screw 43. Through the yoke 48 pivotally mounted on the crank shaft 51 and stub shaft 50 this moves the intermediate frame 11 in a vertical direction, the movement of this intermediate frame 11 being guided by the four parallelogram arms 24 from the base structure 10 so that the intermediate frame 11 always remains vertically positioned.

Downward movement of this intermediate frame 11 is limited by a sleeve 55 serving the rod 43 and interposed between the nut and bevel gear 45, 46 and the ears 41 of the supporting bracket 40. Upward movement of this intermediate frame 11 is limited by a cross pin 56 at the upper threaded end of the screw shaft 43.

As best shown in FIG. 6, each end of each of the cross pins 33, 34 carries a bearing bushing 58 rotatable on its pin. Each bearing bushing 58 supports the fulcrum end of a lever arm 59 which extends generally in the same direction but is considerably longer than a companion parallelogram lever arm 24, as best shown in FIG. 3. As best shown in FIG. 6, the fulcrum ends of the upper pair of lever arms 59 are rigidly connected by a U-shaped yoke 60, this yoke having depending end arms 61 which also contain the corresponding bearing bushings 58 and are welded, as indicated at 62, to the fulcrum end of the corresponding lever arm 59.

As best shown in FIGS. 3 and 6, one of the lower arms 59 is welded to a cross bar 63 which also contains the corresponding bearing bushing 58, this lever arm 59 and cross bar 63 forming a T-shaped structure. This cross bar 63 is held in spaced relation to the end disk or plate 64 of a rubber spring 65 by the enlarged central parts of a pair of spacer studs 68 which extend through the end plate 64 and through opposite ends of the cross bar 63 so as to compel these parts to rotate in unison about their bearing bushings 58. It will be seen that these spacer studs 68 and cross bar 63 provide a space 59 for the corresponding parallelogram lever arms 24 as best shown in FIG. 6.

Also as shown in this FIG. 6, the end plate 64 of the rubber spring 65 is carried by a bearing bushing 70 on the lower cross pin 34. This end plate 64 is also vulcanized to the axial end of a generally cylindrical rubber body 71. The opposite axial end of this rubber body is vulcanized to an adjustable anchoring plate 72. This adjustable anchoring plate 72 has a hub 73 journalled on the lower cross pin 34.

Figure 1:
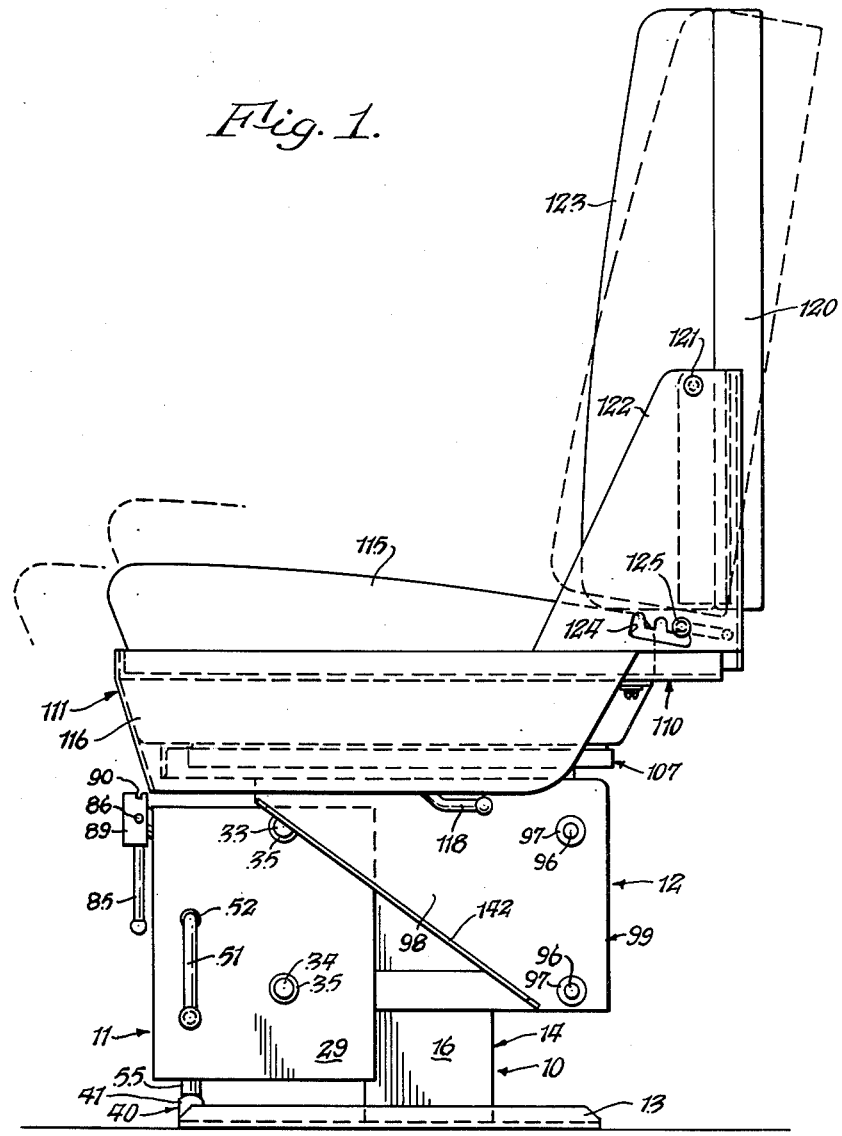
FIG. 1 is a side elevational view of a seat structure embodying the present invention and showing the same in its occupied position.
Figure 2:
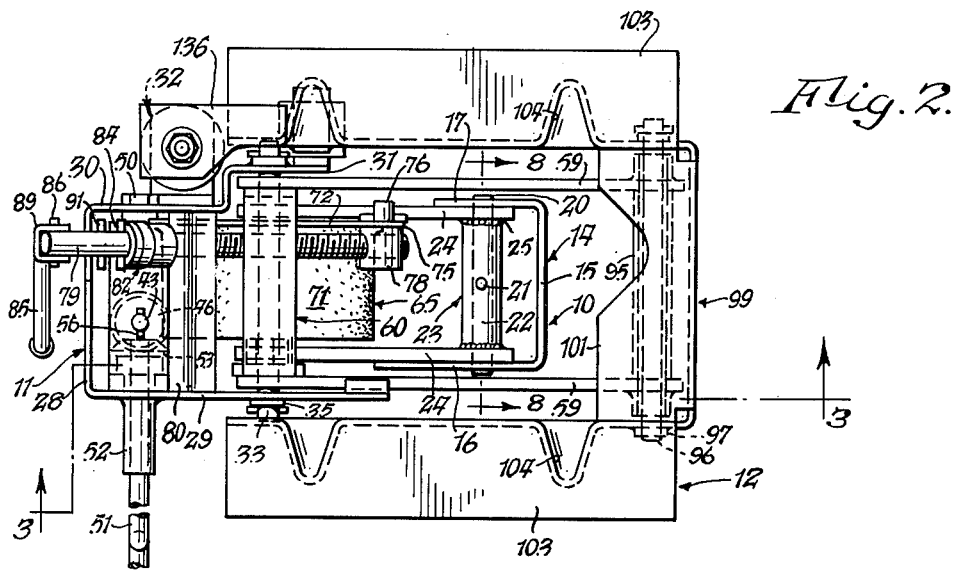
FIG. 2 is a horizontal sectional view taken generally on line 2—2 FIG. 3.

This adjustable anchoring plate 72 is adjustably restrained against rotation by a mechanism which operates to adjust the degree of windup or pertension of the rubber spring 65 and is preferably constructed as follows:

The adjustable anchoring plate 72 is formed to provide a radially projecting marginal ear 75 as best shown in FIGS. 3 and 4 and this ear carries a pivot pin 76 which has an enlarged head in the form of a nut 78. In this nut is screwed the threaded end of an adjusting screw 79 which extends diagonally upwardly and forwardly therefrom through an opening in a cross bar 80 which is secured at its opposite ends to the side walls or flanges 29, 30 of the intermediate frame 11 in any suitable manner. This cross bar 80 is preferably of U-shaped cross section with a forwardly protruding V-shaped nose against which is seated one part 81 of a thrust bearing 82. The other part 83 of this thrust bearing bears against a cross pin 84 on the screw shaft 73. A crank handle 85 is pivoted as at 86 to the upper front end of the screw 79, this handle normally hanging in the inoperative position shown. To render the handle operative it is L-shaped, as shown in FIGS. 2 and 3 and the pin 86 extends through a pair of longitudinal slots 88 in the legs of a bracket 89 which is U-shaped in cross section. Corresponding ends of these legs of the bracket 89 have end notches 90 forming jaws for driving engagement with a cross pin 91 on the screw 79.

To raise or lower the intermediate frame 11 of the seat structure, the handle 85 is first lifted until the jaw 90 is in line with the cross pin 91, this being permitted by the pivot pin 86. The handle 85 is then moved axially along the screw shaft until its jaw 90 operatively engages this cross pin, this movement being permitted by the slot 88. By reason of the L-shape of the handle 85, the screw shaft 79 is now turned by turning the handle 85.

Turning the screw 79 moves the nut along the threaded portion thereof, the screw being held against longitudinal movement by reason of the thrust bearing 82 interposed between the cross pin 84 on the screw and the cross bar 80 of the intermediate frame 11.

Accordingly, the anchor plate 72 of the screw is rotated to prestress or wind up the rubber body 71 vulcanized thereto, this being affected by virtue of a stop limiting the upward movement of the seat part 12 of the seat structure as hereinafter described.

Figure 7:
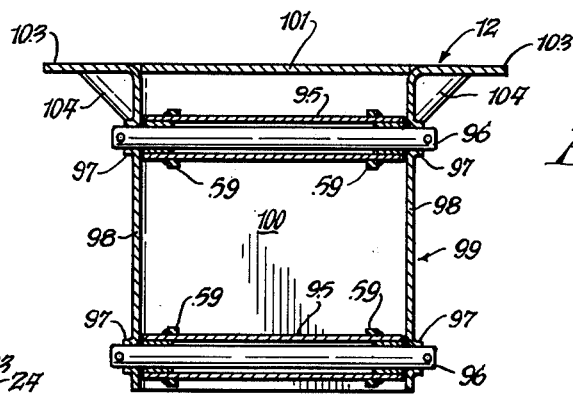

The lever arms 59 are of the same effective length and longer than the lever arms 24 but project in the same direction, namely, horizontally and rearwardly. As best shown in FIGS. 2 and 7 the rear ends of these arms embrace and are welded to a pair of tubes 95 each of which is journalled on a cross pin 96 by means of a pair of bearing bushings in each end of each tube 95. The pins 96 are arranged in a vertical plane and spaced above each other a distance substantially equal to the spacing of the pins 33, 34 and it will therefore be seen that the four lever arms 59 provide a parallelogram linkage at each side of the seat structure. It will also be noted that by welding the upper pair of these arms 59 to the upper cross tube 95 these three parts are in the form of a U-shaped yoke and that similarly by welding the lower pair of arms 59 to the lower tube 95 these three parts are welded in the form of a U-shaped yoke, these yokes providing lateral stability against lurching of the seat part 12 from one side to the other in service.

Each pin 96 is press fitted in a boss 97 struck outwardly from the side walls 98 of a bottom bracket 99 of the seat part 12. These walls 98 are connected at their rear ends by an integral rear wall 100 so that this bottom bracket is in the form of a sheet metal shell which is U-shaped in horizontal section. This shell or bracket 99 also includes a top flange 101 extending forwardly from the top of the rear wall 100 and also includes horizontal flanges 103 projecting laterally outwardly from the side walls 99 of the shell, these latter flanges preferably being reinforced by V-shaped offsets 104.

Each side flange 103 of the bracket shell 101 carries a track 105 mounted thereon to extend fore-and-aft with reference to the seat structure. Each track 105 is of U-shaped form in cross section with its sides projecting upwardly and each terminating in an outwardly projecting horizontal flange 106. A slide rail 107 embraces each of the tracks 105 being, for this purpose, of inverted U-shaped form in cross section and having bottom inturned flanges 108 which embrace the side flanges 106 of the tracks 105 as best shown in FIG. 5. Balls 109 can be interposed between the tracks 105 and slide rails 107 so that the slide rails can be readily moved fore-and-aft.

The slide rails 107 are fastened to the underside of the side frames 110 of the chair frame 111, which forms part of the seat part 12.

These side frames include horizontal fore-and-aft bottom bars 112, in the form of angle irons, having risers 113, 114 at its front and rear ends. These side frames 110 can be cross connected in any suitable manner (not shown) and support a resilient seat cushion 115. These side frames 110 also support an apron 116 which extends downwardly therefrom and extends around the front and side of the seat part 12 to conceal the moving parts of the suspension and to protect the operator from possible inadvertent injury to his hands.

Any suitable latch mechanism (not shown) can be provided to hold the slide rails 107 at any desired position of adjustment along the tracks 105 and a handle 118 can be suitably welded to one side frame 111 to facilitate this adjustment.

A backrest frame 120 is shown as pivoted at 121 to upright brackets 122 at the rear corners of the frame 111 of the seat part 12 and is shown as provided with a back cushion 123. Preferably the angularity of this cushion can be adjusted by means of a toothed slot 124 and pin 125, this adjustment forming the subject of the Simons, Radke and Hickman Patent 2,855,026 to which reference is made for a more complete disclosure thereof.

A feature of the invention resides in the use of the shock absorber 32. This shock absorber is in the form of a hydraulic shock absorber having one part 131 telescoping into its other part 132 and being arranged vertically in the recess provided by the offset 31 of one side wall 30 of the intermediate frame 11. The part 131 of the shock absorber is shown as secured, through a flexible rubber joint 133, to an L-shaped bracket 134 at the bottom of the side wall 30 of the intermediate frame 11. The other part 132 of the shock absorber is shown as secured, through a flexible rubber joint 135, to a bracket 136 fast to one top flange 103 of the bracket 99 which forms the bottom of the seat part 12.

A resilient bottoming bumper 140 is shown as mounted on an L-shaped bracket 141 projecting from the side wall 30 of the intermediate frame 11 and in position to engage a bottom flange 142 of the side wall 98 of the bracket 99 which forms the bottom of the seat part 12.

In use, the operator first adjusts the seat part 12 to an elevation suited to his stature and leg length. He does this by turning the chank shaft 51 which, through the pinions 53, 46 turns the nut 45. This nut rides on the vertical screw 43 which, through the swinging inverted U-shaped bracket 48 and its pivotal mounting 50, 51, raises the intermediate frame 11 relative to the base part 10 of the seat structure. In this movement of the intermediate frame 11 it is guided by the two pairs of vertically acting parallelogram lever arms 24 secured to the intermediate frame and these pairs being arranged on opposite sides of the post 14 to which they also pivotally are secured. As previously indicated, the upper pair of these lever arms 24 are cross connected by a sleeve 22 and the lower pair of these lever arms are also cross connected by a sleeve 22 so that these levers are also in the form of U-shaped yokes which prevent listing of the intermediate frame under off-center loads which may be imposed thereon. Since the seat part 12 is resiliently supported on this intermediate frame 11 it will be seen that this adjusts the vertical position of the driver, when seated, with reference to the vehicle controls.

The driver can also adjust the chair frame 111 fore-and-aft and for this purpose can use the handle 118. In such adjustment the driver releases a latching device (not shown) to free the slide rails 107 for movement lengthwise of the tracks 105 on the balls 109. Accordingly the chair frame to which these slide rails 107 are attached can be moved fore-and-aft with reference to the bracket 99 which carry these tracks. After suitable adjustment, the latching device (not shown) is restored to operation.

The operator can then adjust the degree of pretension or windup of his rubber spring 65. He does this by swinging the crank 85 about the pivot pin 86 so as to bring the notch 90 into line with the pin 91 on the screw shaft 79. After engagement of this notch and pin the crank 85 can be turned so as to turn the screw shaft 79. Since the screw shaft 79 is held against axial movement through the thrust bearing 82 and abutment 80, this moves the nut 78 along the screw shaft 79. Since this nut is pivotally secured to the anchoring plate 72 of the rubber spring 65, this adjustment increases or decreases the amount of pretension in the rubber body 71 to suit the weight of the driver.

After the seat has been so adjusted, it is ready for use and on encountering a bump in the field the chassis of the tractor is driven upwardly thereby to raise the base part 10 of the seat structure. Because of the weight of the driver seated upon the cushioned chair frame 111 this force is not, however, transmitted directly to the driver and the seat part 12 goes down, the four parallelogram lever arms 59, swing downwardly about the cross pins 33, 34 as an axis in a clockwise direction as viewed in FIG. 3. Through the cross bar 63 and spacing lugs 68, the movement of one of these lever arms 59 is transmitted to the movable plate 64 of the rubber spring 65 and this movable plate is rotated in a clockwise direction as viewed in FIG. 3.

Since the opposite axial end of the rubber body 71 of this rubber spring is vulcanized to the stationary, but adjustable, anchoring plate 72 it will be seen that this downward movement of this lever arm 59 is yieldingly resisted by the rubber spring 65 to cushion the impact resulting from the tractor encountering a bump in the field. If the bump is severe enough the seat part 12 will bottom on the rubber bumper 140.

As the seat part 12 descends, it is guided so that it cannot have any material pitch or lateral list. This is effected by the two pairs of parallelogram lever arms 59 which are journalled on the pivot pins 33, 34 which also journal the lever arms 24. Since the lever arms 59 are in parallelogram arrangement it will be seen that the seat part 12 of the seat structure is adequately guided for direct up and down movement. Also by cross connecting the fulcrumed ends of the upper pair of these lever arms 59 by a sleeve 95 and by similarly cross connecting the lower pair of these lever arms 59, by a similar sleeve 95 stability against racking on sidewise lurching or listing of the seat part 12 relative to either the intermediate frame 11 or the base part 10 is prevented.

From the foregoing it will be seen that the present invention provides a sturdy but low cost seat accomplishing the various objects set forth.

What is claimed is:

1. A seat structure, comprising a seat part, a base part arranged under said seat part, an intermediate frame arranged between and movable vertically with reference to both said seat part and said base part, a pair of generally horizontal lever arms arranged one above the other in generally parallelogram arrangement at each of two opposite sides of said intermediate frame, horizontal pivots on generally parallel axes severally connecting the ends of said lever arms to said intermediate frame and to one of said parts, resilient means yieldingly resisting vertical movement of said one of said parts relative to said intermediate frame, means guiding said intermediate frame for vertical movement relative to said other of said parts, and means adjustably securing the other of said parts to raise and lower said intermediate frame with reference to said other of said parts.

2. A seat structure, comprising a seat part, a base part arranged under said seat part, an intermediate frame arranged between and movable vertically with reference to both said seat part and said base part, a pair of generally horizontal lever arms arranged one above the other in generally parallelogram arrangement at each of two opposite sides of said intermediate frame, horizontal pivots on generally parallel axes severally connecting the ends of said lever arms to said intermediate frame and to one of said parts, resilient means yieldingly resisting vertical movement of said one of said parts relative to said intermediate frame, an additional pair of generally horizontal lever arms arranged one above the other in generally parallelogram arrangement at each of two opposite sides of said intermediate frame, horizontal pivots on generally parallel axes severally connecting the ends of said additional lever arms to said intermediate frame and to the other of said parts, said additional pairs of lever arms oscillating relative to said intermediate frame about the same axes as the first mentioned pairs of lever arms, and vertically moving adjustable screw means operatively interposed between said intermediate frame and said other of said parts to raise and lower and adjust the vertical position of said other of said parts with reference to said intermediate frame.

3. A seat structure, comprising a seat part, a base part arranged under said seat part, an intermediate frame arranged between said seat part and said base part and movable vertically with reference to both, a pair of generally horizontal lever arms arranged one above the other in generally parallelogram arrangement at each of two opposite sides of said intermediate frame, pivot means having generally horizontal parallel axes severally connecting the opposite ends of said parallelogram lever arms to said intermediate frame and to said seat part, resilient means yieldingly resisting vertical movement of said seat part relative to said intermediate frame, means guiding said intermediate frame for vertical movement relative to said base part and means adjustably mounting said intermediate frame on said base part for vertical movement relative to said base part.

4. A seat structure, comprising a seat part, a base part arranged under said seat part, an intermediate frame arranged between said seat part and said base part, a pair of generally horizontal lever arms arranged one above the other in generally parallelogram arrangement at each of two opposite sides of said intermediate frame, horizontal pivots on generally parallel axes severally connecting the ends of said lever arms to said intermediate frame and to said seat part, resilient means yieldingly resisting vertical movement of said seat part relative to said intermediate frame, an additional pair of generally horizontal lever arms arranged one above the other in generally parallelogram arrangement at each of two opposite sides of said intermediate frame, horizontal pivots on generally parallel axes severally connecting the ends of said additional lever arms to said intermediate frame, and vertically extensible screw means operatively interposed between said base part and said intermediate frame to raise and lower the vertical position of said intermediate frame with reference to said base part.

5. A seat structure, comprising a base, a post which is U-shaped in horizontal section rising from said base, an intermediate frame which is movable vertically with reference to said base and is U-shaped in horizontal section and arranged with its open vertical side opposing the open side of said post, a pair of generally horizontal lever arms arranged one above the other in generally parallelogram arrangement in said post and intermediate frame at each of two opposite sides thereof, horizontal pivots on generally parallel axes severally connecting the ends of said lever arms to said post and said intermediate frame, vertically extensible adjustment means operatively interposed between said intermediate frame and base to raise and lower them with reference to each other, a seat part movable vertically relative to said intermediate frame and base, an additional pair of generally horizontal lever arms arranged one above the other in generally parallelogram arrangement in said intermediate frame at each of two opposite sides thereof and projecting outwardly therefrom alongside said post, horizontal pivots on generally horizontal axes severally connecting the ends of said additional lever arms to said intermediate frame and to said seat part, and resilient means yieldingly supporting said seat part on said intermediate frame.

6. A seat structure, comprising a base, a post which is U-shaped in horizontal section rising from said base, an intermediate frame which is movable vertically with reference to said base and is U-shaped in horizontal section and arranged with its open vertical side opposing the open side of said post, a pair of generally horizontal lever arms arranged one above the other in generally parallelogram arrangement in said post and intermediate frame at each of two opposite sides thereof, a pair of horizontal pivot pins secured to the opposite side walls of said U-shaped intermediate frame and bridging the space therein and pivotally supporting the corresponding ends of said lever arms, pivots having axes generally parallel with said pivot pins connecting the opposite ends of said lever arms to said post, a seat part movable vertically relative to said intermediate frame and base, an additional pair of generally horizontal lever arms arranged one above the other in generally parallelogram arrangement on each of two opposite sides of said post and journalled on said pivot pins, pivots having axes generally parallel with said pivot pins connecting the opposite ends of said additional lever arms with said seat part, and resilient means yieldingly supporting said seat part on said intermediate frame.

7. A seat structure, comprising a seat part, a base part arranged under said seat part, an intermediate frame arranged between said seat part and said base part, a pair of generally horizontal lever arms arranged one above the other in generally parallelogram arrangement at each of two opposite sides of said intermediate frame, horizontal pivots on generally parallel axes severally connecting the ends of said lever arms to said intermediate frame and to one of said parts, resilient means yieldingly resisting vertical movement of said one of said parts relative to said intermediate frame, an additional pair of generally horizontal lever arms arranged one above the other in generally parallelogram arrangement at each of two opposite sides of said intermediate frame, horizontal pivots on generally parallel axes severally connecting the ends of said additional lever arms to said intermediate frame and to the other of said parts, a cross member rigidly connecting together the ends, pivoted to said intermediate frame, of the upper pair of said first mentioned lever arms, a cross member rigidly connecting together the ends, pivoted to said intermediate frame, of the lower pair of said first mentioned lever arms, a cross member rigidly connecting together the ends, pivoted to said seat part, of the uppper pair of said additional lever arms, and a cross member rigidly connecting together the ends, pivoted to said seat part, of the lower pair of said additional lever arms.

8. A seat structure, comprising a base, a post rising from said base, an intermediate frame, a pair of generally horizontal lever arms arranged one above the other in generally parallelogram arrangement at each of two opposite sides of said post and intermediate frame, horizontal pivots on generally parallel axes severally connecting the ends of said lever arms to said post and to said intermediate frame, a pair of fore-and-aft rails arranged above said post and intermediate frame, an additional pair of generally horizontal lever arms arranged one above the other in generally parallelogram arrangement at each of two opposite sides of said intermediate frame, horizontal pivots on generally parallel axes severally connecting the ends of said additional lever arms to said intermediate frame and to said rails, a seat movably supported on said rails for fore-and-aft movement thereon, resilient means resiliently supporting said rails on said intermediate frame, and vertically extensible adjustment means interposed between said intermediate frame and base to raise and lower and adjust the vertical position of said intermediate frame with reference to said base.

References Cited in the file of this patent

UNITED STATES PATENTS

| | | |
|---|---|---|
| 2,555,160 | Schwartz | May 29, 1951 |
| 2,652,880 | Gundersen | Sept. 22, 1953 |
| 2,667,209 | Gundersen | Jan. 26, 1954 |
| 2,856,984 | Simmons et al. | Oct. 21, 1958 |
| 2,894,562 | Peller | July 14, 1959 |